(12) United States Patent
Higgins

(10) Patent No.: US 7,985,272 B2
(45) Date of Patent: *Jul. 26, 2011

(54) SIFTING APPARATUS WITH FILTER ROTATION AND PARTICLE COLLECTION

(76) Inventor: Charles George Higgins, Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,095

(22) Filed: Oct. 12, 2010

(65) Prior Publication Data

US 2011/0030324 A1    Feb. 10, 2011

Related U.S. Application Data

(63) Continuation of application No. 11/890,817, filed on Aug. 8, 2007, now Pat. No. 7,833,303.

(51) Int. Cl.
*B01D 46/30* (2006.01)
(52) U.S. Cl. ............... 55/400; 55/330; 55/337; 55/401; 55/428; 209/233; 209/288
(58) Field of Classification Search .................... 55/330, 55/337, 392, 400, 401, 407, 408, 409, 428, 55/429; 95/277, 270; 209/133, 284, 288, 209/713, 233; 210/107
See application file for complete search history.

(56) References Cited

U.S. PATENT DOCUMENTS

| | | | | |
|---|---|---|---|---|
| 9,608 A | * | 3/1853 | Bessimer | 210/402 |
| 801,703 A | * | 10/1905 | Anderson | 209/234 |
| 3,659,714 A | * | 5/1972 | Valdespino | 210/107 |
| 3,736,728 A | * | 6/1973 | Kleissler, Jr. | 55/341.1 |
| 3,763,631 A | * | 10/1973 | Horn et al. | 95/154 |
| 3,857,687 A | * | 12/1974 | Hamilton et al. | 55/337 |
| 3,951,630 A | * | 4/1976 | Kleissler, Jr. | 55/378 |
| 3,966,441 A | * | 6/1976 | Freze | 55/290 |
| 4,189,310 A | * | 2/1980 | Hotta | 55/317 |
| 4,623,449 A | * | 11/1986 | Bohnensieker | 209/250 |
| 4,874,409 A | * | 10/1989 | Vitovec et al. | 55/282.2 |
| 4,948,397 A | * | 8/1990 | Kumar | 95/277 |
| 5,401,407 A | * | 3/1995 | Jones et al. | 210/369 |
| 5,607,587 A | * | 3/1997 | Langner | 210/380.3 |

FOREIGN PATENT DOCUMENTS

| | | | |
|---|---|---|---|
| JP | 2000 319926 | * | 11/2000 |
| JP | 2007 130381 | * | 5/2007 |

* cited by examiner

*Primary Examiner* — Duane Smith
*Assistant Examiner* — Sonji Turner
(74) *Attorney, Agent, or Firm* — Franklin & Assocs. Intl LLC; Matthew Lambrinos

(57) ABSTRACT

Sifting apparatus, for sifting solid particles from a gaseous or liquid fluid, having a rotating conical filter and fan blade assembly connected to the filter exterior, both rotated together by a motor/pulley assembly, the fan blades slanted in a direction opposite the rotation direction, so that air is drawn through the filter from its interior to its exterior, having an inlet for admission of air only at the narrow end of the filter, and having a receptacle for collection of the particles at the broad end of the filter. Applications include cleaning of particle contaminants from air; cleaning beach sand by sifting out broken glass, sea weed or other debris; extraction of mineral particles from water slurry; collection of soil samples picked up by an air stream; lawn maintenance collection of weeds, leaves and burrs; biohazard removal operations; and an alternative to auger food particle transport in food processing.

20 Claims, 2 Drawing Sheets

SIFTING APPARATUS WITH FILTER ROTATION AND PARTICLE COLLECTION

CROSS-REFERENCE TO RELATED APPLICATIONS

This present application is a continuation of U.S. patent application Ser. No. 11/890,817, entitled "Sifting Apparatus", which was filed on Aug. 8, 2007. The disclosure of said U.S. patent application Ser. No. 11/890,817 is herein incorporated by reference.

BACKGROUND OF THE INVENTION

The present invention pertains to apparatus for sifting out solid particles contained in a gaseous or liquid fluid, having fan or pumping fluid impeller means for causing the fluid to flow through a filter which collects particles larger than the filter aperture size while allowing smaller particles to pass with the fluid out of the apparatus. In this application the word "particle" shall mean any fragment of a solid substance, of whatever size, contained in the gaseous or liquid fluid, so as to be siftable out from the fluid by such apparatus if the particle is larger than the filter aperture size.

There are numerous and quite varied possible applications for such sifting apparatus, as further discussed below, including, for example, cleaning of particle contaminants from air or other gases; cleaning beach sand by sifting out broken glass or other debris which could harm the feet of bathers or detract from the appearance of the beach; extraction of valuable mineral particles contained in a water slurry; collection of soil samples which could be picked up by an air stream; lawn maintenance collection of weeds, leaves and burrs; radiation hazard removal operations, such as removal of a plutonium fragment or dust spill at a nuclear facility; biohazard removal operations, such as removal of spilled anthrax particles; an alternative to auger type transport of food particles in food processing operations; and undersea collection of coins or other small treasure items found around a shipwreck.

The present invention may in various embodiments be useful for any such applications, among others, and employs an approach, detailed below, which synergistically combines two distinct physical means for sifting particles from a fluid.

SUMMARY OF THE INVENTION

As a summary, this section of course does not explicate the invention in all the detail of the subsequent detailed description and claims. It is intended that the relative brevity of this summary shall not limit the scope of the invention, which scope is to be determined by the claims, properly construed, including all subject matter encompassed by the doctrine of equivalents as properly applied to the claims.

In the summary and detailed description, "fluid of interest" will be used generally to denote air or any other any gaseous or liquid fluid of interest for use of the apparatus in sifting particles which may be contained within said fluid.

The basic approach of the present invention synergistically combines a rotating filter, tapered in diameter between a narrow fluid inlet end to a broader particle collection end having a connected particle collection receptacle, the filter wall containing numerous filter apertures; an impeller drawing fluid of interest into the filter's fluid inlet and outward through the filter wall, the wall stopping particles larger than the filter apertures, and the filter rotation causing the trapped particles to move along the wall to the particle collection receptacle, as a result of the centrifugal force on each particle from the filter rotation, which force has a component along the surface of the filter wall in the direction of the particle collection receptacle, because of the tapering filter wall geometry. Thus sifting is synergistically accomplished by the combination of the filtering and rotation-induced motion of the trapped particles into the collection receptacle.

In one broad aspect the invention comprises a filter, having a filter wall with an interior surface and an exterior surface, having a principal longitudinal axis and having the shape of a surface of revolution about said axis, said filter tapering in diameter between a broader open particle collection end and a narrower open fluid inlet end, and having numerous small filter apertures extending through said filter wall from said interior surface of said filter wall to said exterior surface of said filter wall;
a motor means, connected to said filter, for rotating said filter in a rotation direction about said axis of said filter; a fluid impeller means, connected to said filter, for causing said fluid of interest to flow into said fluid inlet end of said filter and to flow out of said filter through said filter apertures; and a particle collection receptacle connected to said filter at said particle collection end of said filter.

In some embodiments the invention comprises the elements as described above in which said filter is at least substantially of the shape of a frustum of a cone extending between said fluid inlet end and said particle collection end.

In some embodiments the invention comprises the elements as described above in which said fluid impeller means comprises a rotating cylindrical fan blade assembly surrounding and coaxial with said filter, connected to and rotating with said filter, said fan blades being slanted in a direction opposite said rotation direction.

BRIEF DESCRIPTION OF THE DRAWINGS

In the drawings, which all relate to the same embodiment of the invention.

DETAILED DESCRIPTION

Figure 1:
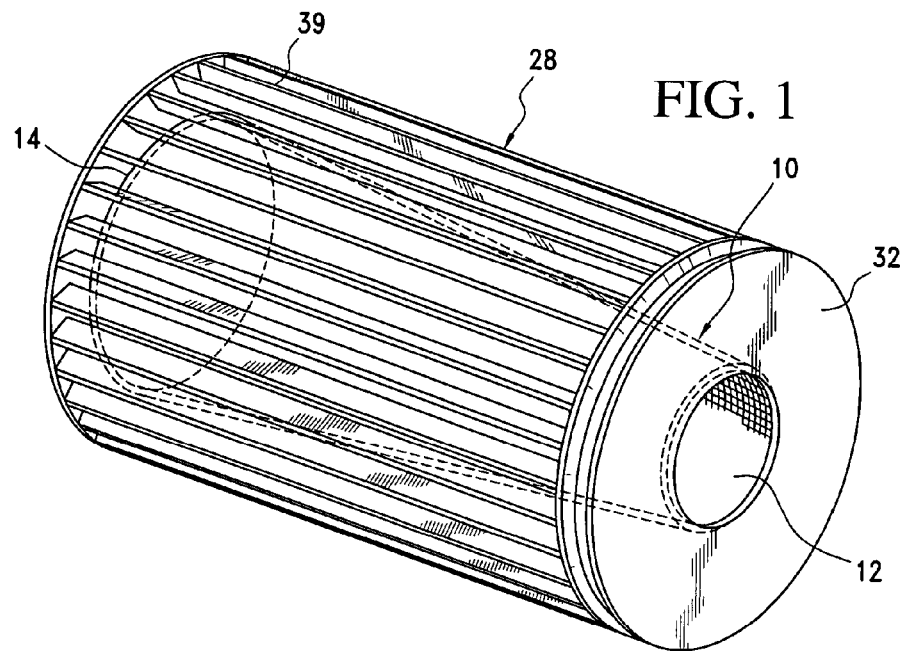
FIG. 1 is a perspective view of the fan blade assembly surrounding the cone shaped filter, with the filter position shown in phantom, for simplicity and clarity omitting the apparatus housing shown in FIG. 2.

Referring now to the drawings, in which like reference numbers denote like or corresponding elements, an embodiment designed for removal of particles from air as the fluid of interest is shown in FIGS. 1-6.

The apparatus has a filter 10, of the form of a frustum of a cone, open at a fluid intake end 12 and at a particle collection end 14, having a fluid tight particle collection receptacle 16 connected to particle collection end 14 of filter 10 by a fluid tight connector 18. The filter wall 20, having an interior surface 22 and an exterior surface 24, has numerous filter apertures 26 extending through filter wall 20, connecting interior surface 22 with exterior surface 24, which are small enough to allow filter 10 to capture particles of interest contained in the fluid of interest.

The filter 10 is surrounded by fan blade assembly 28, of a type commonly known as a squirrel cage type also commonly known as a centrifugal fan, with filter 10 and fan blade assembly 28 being coaxial and rotatably mounted on ring bearings 30, and with filter 10 and fan blade assembly 28 being also securely fastened to one another by annular baffle plates 32 which extend between filter 10 and fan blade assembly 28 at the ends of filter 10, so that filter 10 and fan blade assembly 28 are rotatable together.

Figure 2:
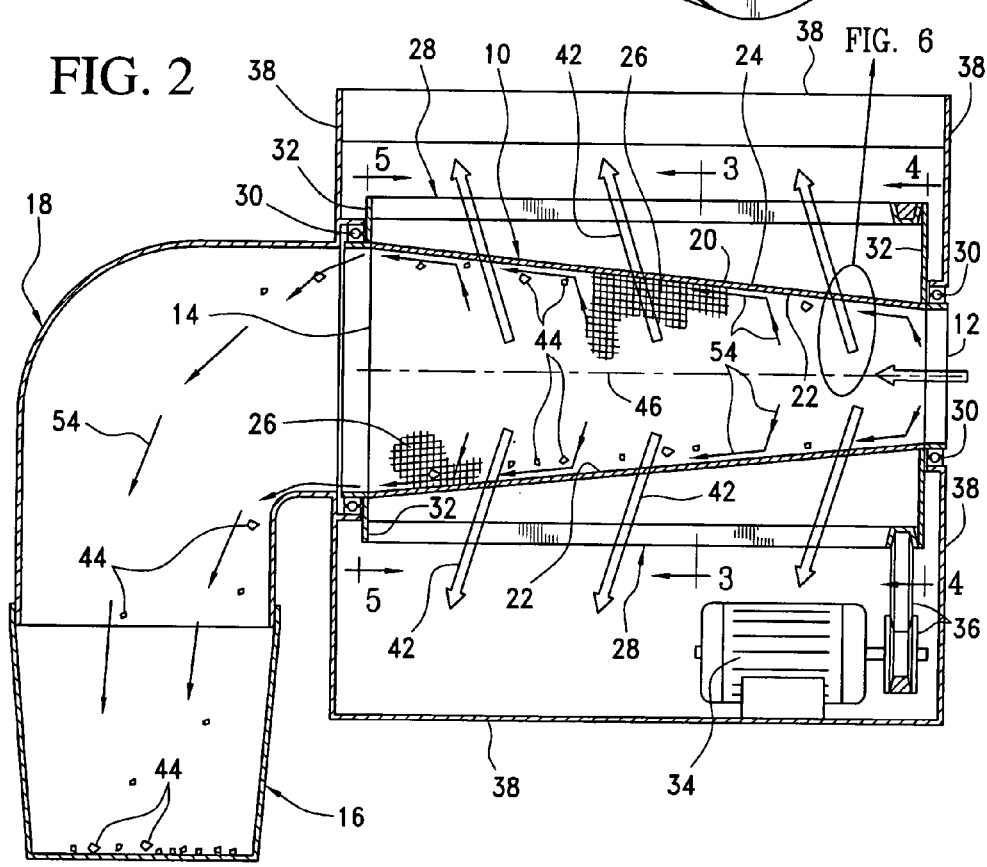
FIG. 2 is a side elevational sectional view of the apparatus in a housing, through the principal axis of the filter and fan blade assembly.

Rotation of filter 10 and fan blade assembly 28 may conveniently be accomplished by a rotation means in the form of a motor 34 and a conventional pulley belt assembly 36 connecting motor 34 to fan blade assembly 28, as indicated in FIG. 2.

As also indicated in FIG. 2, the filter 10, fan blade assembly 28, ring bearings 30, baffle plates 32, motor 34 and pulley belt assembly 36 are contained and supported by a housing 38.

Figure 3:
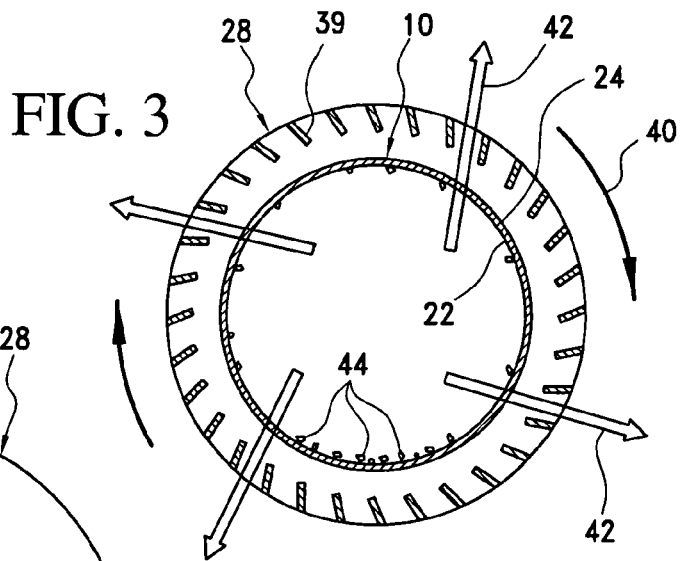
FIG. 3 is a sectional view as indicated by the lines 3-3 in FIG. 2, omitting the apparatus housing, motor and pulley belt assembly.
Figure 4:
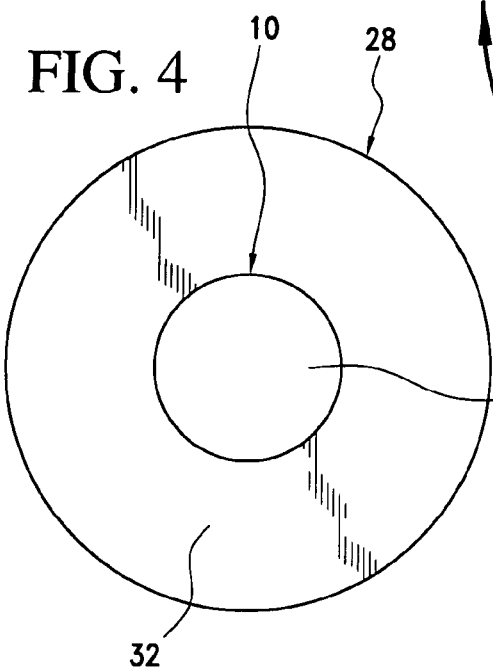
FIG. 4 is a sectional view as indicated by the lines 4-4 in FIG. 2, at the intake end of the filter, omitting the housing, motor and pulley belt assembly.
Figure 5:
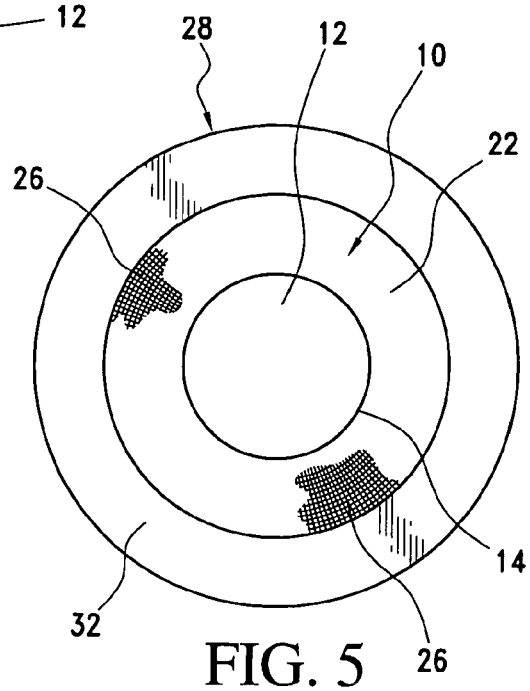
FIG. 5 is a sectional view as indicated by the lines 5-5 in FIG. 2, at the particle collection end of the filter, omitting the housing, motor and pulley belt assembly.

As indicated in FIG. 3, the fan blades 39 of fan blade assembly 28 are inclined in a direction opposite to the direction 40 of rotation of the filter 10 and fan blade assembly 28, so that the motion of fan blade assembly 28 causes the fluid of interest to be drawn outward through filter 10 and fan blade assembly 28, as indicated by the fluid flow arrows 42 in FIGS. 2 and 3.

Thus the combination of motor 34, pulley belt assembly 36, and fan blade assembly 28, constitutes a fluid impeller means, connected to filter 10, for causing fluid of interest to flow into fluid intake end 12 of filter 10 and to flow out of filter 10 through filter apertures 26.

Because of baffle plates 32 extending between filter 10 and fan blade assembly 28 at the ends of filter 10, and because of the fluid tight connection of particle collection receptacle 16 at particle collection end 14 of filter 10, the apparatus provides baffle means to assure that the operation of fan blade assembly 28 can draw fluid of interest only from the fluid intake end 12 of filter 10. Applicant believes that for operations of practical interest in removal of particles from air, this geometry is necessary to allow practical operation of the unit; particularly were the baffle plates 32 to be removed, some air would also be drawn in though the ends of the unit, outside exterior surface 24 of filter 10 and pass out though fan blade assembly 28, without even passing through filter wall 20 of filter 10 so as to allow particle collection.

Figure 6:
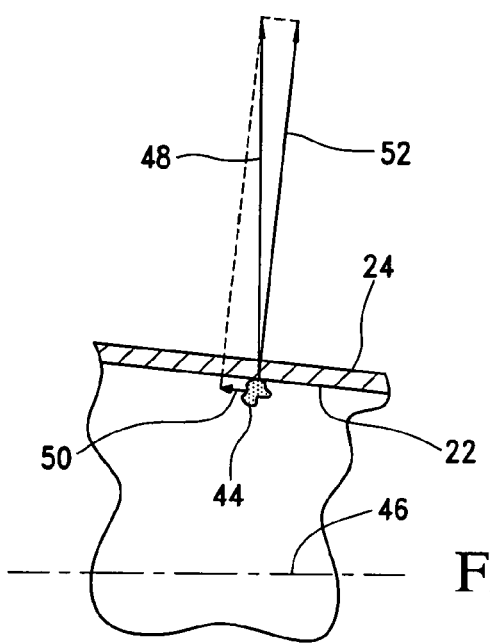
FIG. 6 illustrates a portion of FIG. 2 showing the centrifugal force acting upon a trapped particle on the filter wall, and the components of that force.

The two physical processes involved in sifting particles from the fluid of interest drawn into the apparatus through rotation of fan blade assembly 28, are best understood with reference to FIGS. 2 and 6. The particles 44 to be sifted from the fluid of interest initially travel on paths parallel with the flow paths for air molecules indicated by the fluid flow arrows 42. But when the particles 44 reach interior surface 22 of filter 10, the particles larger than the filter apertures 26 are stopped at interior surface 22. Because of the rotation of filter 10, particles stopped on interior surface 22 rotate with filter 10 about its axis 46, and are thus subject to an outward centrifugal force 48, in a direction directly outward from and perpendicular to the filter axis 46. Because of the cone shaped geometry of filter 10, the interior surface 22 of filter 10 is not at right angles to this centrifugal force, but is instead inclined at an angle to it. As is readily apparent from FIGS. 2 and 6, the outward centrifugal force 48 acting on each of the captured particles 44 will thus have a component 50 parallel to interior surface 22, in the direction of particle collection receptacle 16, as seen in FIG. 6, as well as a component 52 perpendicular to interior surface 22. The component 50 parallel to interior surface 22 will cause the captured particle 44 to travel along interior surface 22 into particle collection receptacle 16. So the path of captured particles 44, while parallel to the gas flow path until the interior surface 22 is reached, will have a sharp break, with a later portion of the path then leading along interior surface 22 toward particle collection receptacle 16, as indicated by the particle path arrows 54.

Thus in the above described embodiment the combination of the rotating filter 10, and the filter geometry, with the particle collection receptacle 16 connected to filter 10 at particle collection end 14, constitutes a particle collection means, for causing collection of particles 44 in response to centrifugal force generated by rotation of filter 10.

Applicant has had a satisfactory working prototype of the apparatus made, in which the motor 34 is a 1 HP electric motor by Marathon Electric, of Wasau Wis., Model DQL56C7D5345 F-P, type SCS, 1725 RPM, 60 hz; and in which the fan blade assembly 28 is by Indiana Fan and Fabrication, and is a modified 13 3/16" diameter Double Inlet Belt Drive Blower Wheel, Item #008507. The manner of operation of the apparatus is straightforward.

The user positions the apparatus with fluid intake end 12 of filter 10 located at a site at which it is desired to draw in fluid of interest for sifting of particles, and commences rotation of filter 10 and fan blade assembly 28 by closing a connection by a switch (not shown) to connect a suitable power source (not shown) to motor 34, in a manner well known in the art.

Some Possible Variations of Embodiments

For example, and not by way of limitation, the following variations of embodiments from the embodiment described above and shown in the drawings, may be suitable for various applications of the invention.

Although the filter 10 is of the form of a frustum of a cone in the described and illustrated embodiment, those familiar with the art will understand that use of this precise geometric form is not necessary, in order to obtain the benefit of the centrifugal force component causing the particles 44 to move along the interior surface 22 of filter wall 20 toward particle collection receptacle 16. In general the filter 10 may be one of a form tapering in diameter between a broader open particle collection end 14, to which particle collection receptacle 16 is connected, and a narrower open fluid intake end 12. The form of filter 10 may be that of a surface of revolution about the axis 46 of filter 10.

And although the fluid motion impeller means of the illustrated embodiment is the fan blade assembly 28 which is connected to filter 10 so that fan blade assembly 28 and filter 10 rotate together by the action of motor 34 and pulley belt assembly 36, it is of course not necessary that the invention be configured in this manner. A separate fan or other fluid motion impeller means may be employed instead, for example a separately rotated squirrel cage fan assembly and motor. But the illustrated embodiment offers relative simplicity of design, manufacture and operation.

A wide variation of sizes for the filter apertures 26 of filter 10 will be natural for differing applications of the invention. For cleaning of fluids of interest, in which it is desired to achieve maximum sifting out of particulate impurities, small filter apertures 26 of the order of micron diameter size may be employed. But much larger filter apertures 26 may be sufficient for certain other applications. For example, if one wished to clean beach sand, by sifting out and removing fragments of broken glass or sea shells or other debris which might hurt the feet of bathers walking along the beach or if one wished to remove sea weed which might be deemed to render the beach unsightly, filter apertures 26 of the order of ⅛" or even larger might be sufficiently small, depending upon the precise application. And if an undersea version of the invention were to be used in treasure hunting around the wreck of a spanish galleon, e.g. to pick up gold coins that could be drawn into the apparatus by water flow caused by the impeller, apertures of ⅛" or even larger might well be sufficiently small. Other possible applications which may call for use of varied filter aperture size include extraction of mineral particles from water slurry; collection of soil samples picked up by an air stream; lawn maintenance collection of weeds, leaves and burrs; radiation hazard removal operations, such as removal of a plutonium fragment or dust spill at a nuclear facility; biohazard removal operations, such as removal of spilled anthrax particles; and an alternative to auger type transport of food particles in food processing operations.

For such applications as biohazard or radiation hazard removal operations, use of a removable liner (not shown) within particle collection receptacle 16 would be desirable.

Although use of the baffle plates 32 is essential or at least highly desirable for some applications of the illustrated embodiment, to assure that all of the fluid of interest which passes through the apparatus enters the filter 10 through fluid intake end 12 and thus passes through filter apertures 26 of filter 10, there may be applications of the invention for which use of such baffling is not necessary. One advantage of the baffling is maximize sifting efficiency by having all of the fluid taken in pass through the filter. Another is to highly localize the location from which fluid of interest is drawn, e.g. to pick up particular targeted items. But for applications in which the apparatus is used only for general sampling of the nature of particles present in the fluid of interest, and collection efficiency and spatial resolution of collection are not critical, a non-baffled version of the apparatus may suffice.

No particular form of motor 34 is required for operation of the invention, provided said motor is sufficiently powerful to achieve desired fluid motion. An electric motor could be used, or possibly a gasoline or diesel powered motor for operations away from electric power sources.

No particular material is required for construction of the invention, which may fabricated of metal, or plastics or other materials of suitable strength.

The invention claimed is:

1. Sifting apparatus, for sifting solid particles from a fluid, comprising:
    (a) a filter, having a filter wall with an interior surface and an exterior surface, having a principal longitudinal axis between a broader open end and a narrower open fluid inlet end, and having numerous small filter apertures extending through said filter wall from said interior surface of said filter wall to said exterior surface of said filter wall; wherein said filter has a geometric form to cause captured particles to travel along said interior surface towards said open end in response to rotation of said filter;
    (b) a rotation means, connected to said filter, for rotating said filter in a rotation direction about said axis of said filter; and
    (c) a fluid impeller means, connected to said filter, for causing said fluid to flow into said fluid inlet end of said filter and to flow out of said filter through said filter apertures; wherein said fluid impeller means comprises a rotating cylindrical fan blade assembly surrounding and coaxial with said filter, connected to and rotating with said filter, said fan blades being slanted in a direction opposite said rotation direction.

2. Sifting apparatus of claim 1, wherein said filter is at least substantially of the shape of a frustum of a cone extending between said fluid inlet end and said open end.

3. Sifting apparatus of claim 1, further comprising
    (d) a particle collection receptacle connected to said filter at said open end of said filter.

4. Sifting apparatus of claim 3, wherein said particle collection receptacle is fluid tight and in fluid tight connection with said filter.

5. Sifting apparatus, for sifting solid particles from a fluid, comprising:
    (a) a filter, having a filter wall with an interior surface and an exterior surface, having a principal longitudinal axis and having the shape of a surface of revolution about said axis, said filter tapering in diameter between a broader open particle collection end and a narrower open fluid inlet end, and having numerous small filter apertures extending through said filter wall from said interior surface of said filter wall to said exterior surface of said filter wall;
    (b) a rotatable cylindrical fan blade assembly surrounding and coaxial with said filter, connected to and rotatable with said filter in a desired rotation direction, said fan blades being slanted in a direction opposite said rotation direction; and
    c) a rotation means, connected to said filter and to said fan blade assembly, for rotating said filter in said rotation direction about said axis of said filter.

6. Sifting apparatus of claim 5, further comprising
    (d) particle collection receptacle, connected to said filter, for collecting said particles leaving said particle collection end of said filter;
    baffle means, surrounding said filter and fan blade assembly, for allowing flow of said fluid through said filter only from said fluid inlet end of said filter.

7. Sifting apparatus, for sifting solid particles from a fluid, comprising:
    (a) a filtration means, for filtering said particles from said fluid; wherein said filtration means comprises a filter, having a filter wall with an interior surface and an exterior surface, having a principal longitudinal axis, said filter tapering in diameter between a broader open particle collection end and a narrower open fluid inlet end, and having numerous small filter apertures extending through said filter wall from said interior surface of said filter wall to said exterior surface of said filter wall
    (b) a fluid impeller means, connected to said filtration means, for causing said fluid to flow through said filtration means; wherein said fluid impeller means comprises a rotatable cylindrical fan blade assembly surrounding and coaxial with said filter, connected to and rotatable with said filter in a desired rotation direction, said fan blades being slanted in a direction opposite said rotation direction;
    (c) a rotation means, for causing rotation of said filtration means; and
    (d) a particle collection means, for causing collection of said particles in response to centrifugal force generated by said rotation of said filtration means, wherein said particle collection means comprises said filter and a particle collection receptacle connected to said filter at said particle collection end of said filter.

8. Sifting apparatus of claim 7, wherein said filtration means has the shape of a surface of revolution about said axis.

9. Sifting apparatus of claim 8, wherein said filter is at least substantially of the shape of a frustum of a cone extending between said fluid inlet end and said particle collection end.

10. Sifting apparatus of claim 7, wherein said rotation means comprises a motor and a pulley belt assembly connecting said motor to said filtration means.

11. Sifting apparatus of claim 1, wherein said rotation means has an electric motor.

12. Sifting apparatus of claim 1, wherein said rotation means has a gasoline powered motor.

13. Sifting apparatus of claim 5, wherein said rotation means has an electric motor.

14. Sifting apparatus of claim 5, wherein said rotation means has a gasoline powered motor.

15. Sifting apparatus of claim 1, wherein said filter apertures are at least substantially 1 micron in diameter.

16. Sifting apparatus of claim 1, wherein said filter apertures are at least substantially ⅛ inch in diameter.

17. Sifting apparatus of claim 7, further comprising baffle means, connected to said filtration means and said fluid impeller means, for allowing flow of said fluid through said filtration means only from a fluid inlet end of said filtration means.

18. Sifting apparatus of claim 1, wherein said filter is fabricated of a metal.

19. Sifting apparatus of claim 1, wherein said filter is fabricated of plastic.

20. Sifting apparatus of claim 3, further comprising baffle means, surrounding said filter and fan blade assembly, for allowing flow of said fluid through said filter only from said fluid inlet end of said filter.

* * * * *